Figure 1:
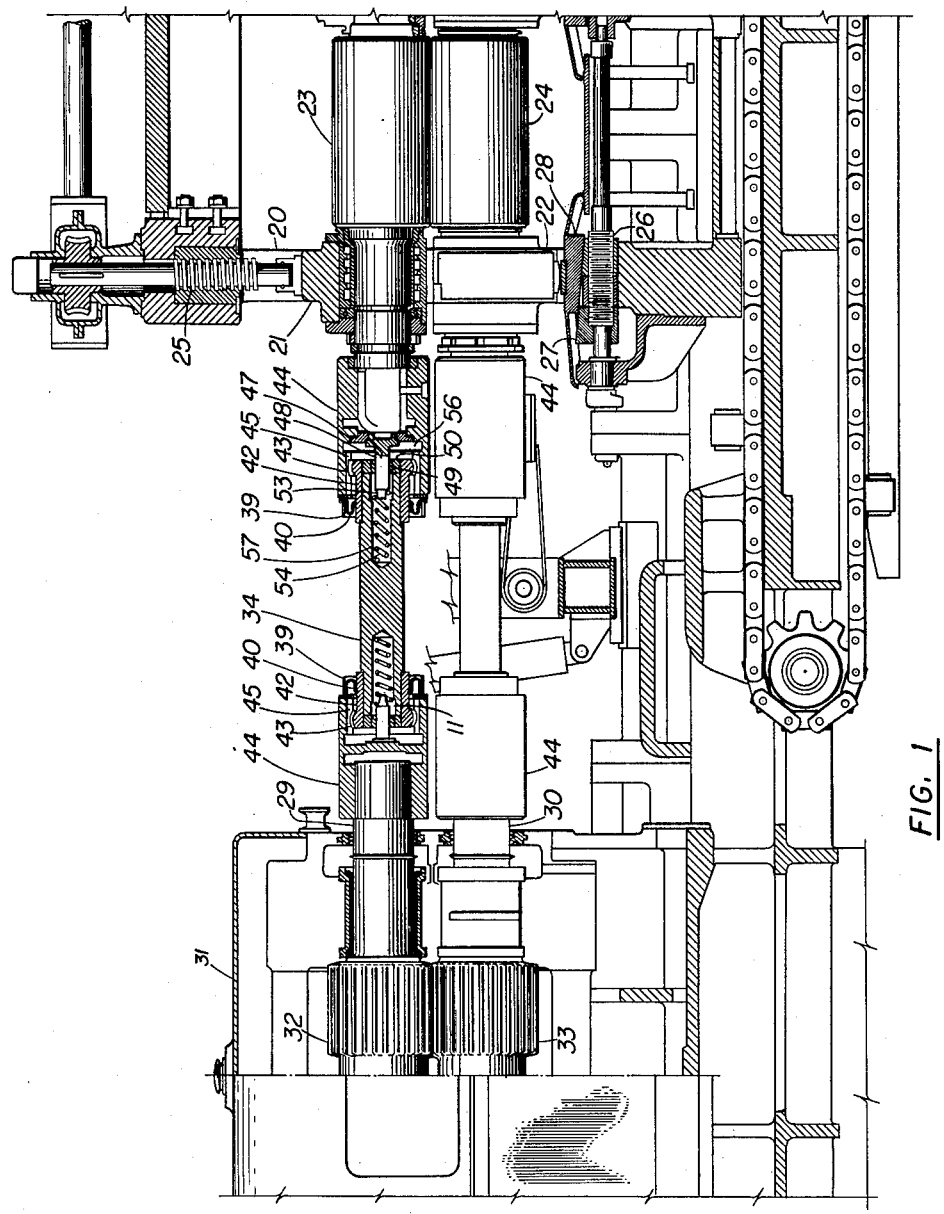

WALTER KRÄMER
WERNER MÜLLER
INVENTORS

March 31, 1964 W. KRÄMER ETAL 3,126,722
COUPLING
Filed Feb. 19, 1962 2 Sheets-Sheet 2

WALTER KRÄMER
WERNER MÜLLER
INVENTORS

BY Norman S. Blodgett

United States Patent Office 3,126,722
Patented Mar. 31, 1964

3,126,722
COUPLING
Walter Krämer, Dahlbruch, Westphalia, and Werner Müller, Eisern, Kreis Siegen, Germany, assignors to Siemag Siegener Maschinenbau G.m.b.H., Dahlbruch, Westphalia, Germany, a corporation of Germany
Filed Feb. 19, 1962, Ser. No. 173,927
Claims priority, application Germany Feb. 20, 1961
4 Claims. (Cl. 64—8)

This invention relates to a coupling and, more particularly, to apparatus arranged to connect drive spindles in rolling mills and the like to their driving and driven associated apparatus.

It is common practice in power transmission applications to use an articulated spindle between the driving and the driven machinery. For instance, in rolling mill applications the drive pinions are commonly connected to the rolling mill by means of elongated spindles, the ends of each spindle being connected to the pinion shaft on one hand and the roll neck on the other hand by means of a gear-type coupling. Such a coupling must be capable of a considerable degree of misalignment between the spindle and the pinion shaft on one hand and between the spindle and the roll neck on the other hand. This is because the rolls of the rolling mill are separated by various amounts at various times so that the separation between the axes of the rolls and the pinion shaft (which necessarily remains fixed) is considerable. There have been versions of such couplings in which springs were used to localize the spindle in the axial direction, but in the radial direction such couplings have permitted a degree of play between the spindle portion of the coupling and the coupling housing. In the case of a gear-type coupling such play would be possible due to inaccuracies in the manufacture of the mating gears. In the case of spindles which are transmitting fairly high rotational speeds, vibration may take place and, in addition to the considerable noise produced, the vibration could in many cases cause rapid wearing of the parts and possible breakage. These and other difficulties experienced with the prior art devices have been obviated in a novel manner by the present invention.

It is, therefore, an outstanding object of the invention to provide a coupling in which lateral play of the parts is reduced to a minimum.

Another object of this invention is the provision of a coupling for rolling mill spindles or the like having resilient means for centering the spindle and having means for preventing undue lateral movement of the parts.

A further object of the present invention is the provision of a gear-type coupling in which lateral and axial vibration is reduced to a minimum.

It is another object of the instant invention to provide a gear-type coupling having a novel lubrication means in which very little leakage takes place.

It is a further object of the invention to provide a gear-type coupling in which extraneous lateral forces are absorbed by means other than the gear surfaces.

It is a still further object of this invention to provide a gear type coupling in which the axial movement of the coupling parts is guided and restrained by means other than the gear surfaces.

With these and other objects in view, as will be apparent to those skilled in the art, the invention resides in the combination of parts set forth in the specification and covered by the claims appended hereto.

Figure 2:
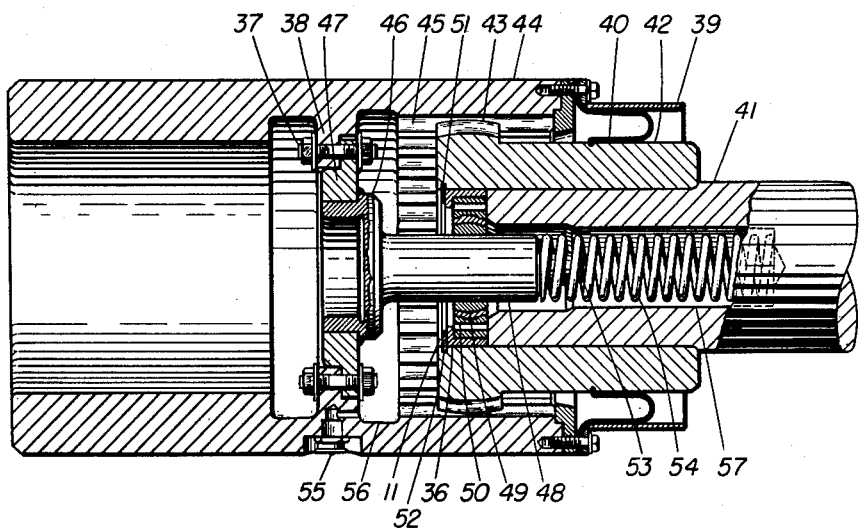

The character of the invention, however, may be best understood by reference to one of its structural forms as illustrated by the accompanying drawings in which:

FIG. 1 is an elevational view with parts broken away of rolling mill apparatus incorporating the principles of the present invention; and FIG. 2 is a vertical sectional view of the coupling of the invention.

Generally speaking, the advantages of the present invention are obtained by incorporating in the spindle coupling a centering device which is partly located in the female portion of the coupling and partly located in the end of the spindle carrying the male portion of the coupling. The centering device consists of a base plate on which is mounted a centering pin. On this centering pin is mounted a bearing in such a manner that axial shifting of the centering pin relative to the bearing is possible, the bearing being mounted in a recess in the end of the spindle. The centering pin is provided with a cone at its free end which serves as a seat for a coil spring which also is housed in a bore in the end of the spindle. The centering device provides a wall which extends across the coupling box and this combines with the gear on the end of the spindle and the coupling box to provide a cavity to receive grease for lubrication.

Referring first to FIG. 1, in which is best shown the general features of the invention, a rolling mill stand 20 is provided with windows in the well-known manner each carrying a set of chocks 21 and 22 for guided vertical movement. The chock 21 contains a bearing in which is rotatably carried the roll neck of a roll 23, while the chock 22 is also provided with a bearing carrying the roll neck of a roll 24. A screwdown 25 is connected to the chock 21 for moving it vertically and for producing coarse gap changes between the rolls 23 and 24. Fine changes in this gap and in roll location are produced by an adjusting screw 26 operating on wedges 27 and 28 which carry the lower roll 24. In addition, the entire rolling mill stand 20 is movable transversely relative to the foundation. A stationary pinion housing 31 carries the pinion gears 32 and 33 which are driven by a mill motor (not shown). The gear 32 is connected to a pinion shaft 29 which extends from the housing 31 toward the mill 20, while the gear 33 is provided with a similar pinion shaft 30 which is vertically spaced from and parallel to the pinion shaft 29. The pinion shaft 29 is connected to the neck of the upper roll 23 by an articulated unit 34, while a similar articulated unit 35 joins the pinion shaft 30 to the neck of the lower roll 24. The articulated unit 34 is provided with a spindle 41, each end of which is provided with an external gear 42 having teeth 43 of a domed configuration, such as that formed where a spherical pitch surface is used. The teeth 43 engage internal gear teeth 45 having a cylindrical pitch surface formed on an internal bore of a coupling box 44. The teeth 45 are much more elongated axially than the teeth 43, so that considerable sliding movement may take place between them; the fact that the teeth 43 are generated from a spherical pitch surface while the teeth 45 are generated from a cylindrical pitch surface permits a considerable degree of angular misalignment between them without sacrifice of power transmitting ability. For protection of the coupling from dirt and the like it is provided with a bellow type seal 40 formed of a flexible material such as rubber or Neoprene and which is fastened to the coupling box 44 on one side and the external gear 42 on the other side. In addition, a sheet metal cover 39 is fastened to the coupling box 44 as an extension thereof to protect the seal 40 from damage.

Located in the coupling box is a centering device 46 which consists of a base plate 47 and a centering pin 48. The base plate 47 is fastened by means of bolts 37 to an annular flange 38 extending inwardly in the bore in the coupling box 44. The centering pin 48 extends in slidable relation through the inner race 49 of a self-aligning roller bearing 50. The bearing is, in turn, mounted in an internal bore 11 of the external gear 42 in which bore the end of the spindle 41 is fastened. The bearing is formed in the usual way with an inner and an outer race between which are interposed the rollers. The inner race is divided, in turn, into an inner and an outer part which are slidably in contact on mating spherical surfaces. The bearing is located within the gear in such a manner that the center of the mating spherical surfaces of the inner race is located at the center of the spherical pitch surface of the gear teeth 43. The centering pin 48 has such a length that the bearing 10 can follow the movement of the external gear 42 relative to the coupling box 44 without the inner race 49 of the bearing leaving the centering pin 48. An outer race 36 of the bearing is locked in the bore of the external gear by means of a snap ring 52 which locks in a radial groove 51 formed in the bore 11 in the external gear 42.

The centering pin 48 is provided on its outer free end with a conical surface 53 which terminates in a shoulder. The surface lies within and makes contact with a coil spring 54 which lies within an axial bore 57 formed in the end of the spindle 41. The spring 54 is of such a size as to be continually under compression, so that the spring acts to cause the coupling box 44 and the external gear 42 to be moved to the most extreme extended position possible. A grease fitting 55 is mounted in the coupling housing 44 and is connected by a passage into a cavity 56 formed by the coupling housing 44, the base 47 of the centering device 46, the external gear 42, and the seal 40. The lubricant, therefore, is available for use between the teeth 43 and 45 as well as the rollers and spherical surfaces of the bearing 50.

The operation of the invention will now be readily understood in view of the above description. The pinion gear 32 is rotated by the mill motor and drives through the pinion shaft 29 and the articulated unit 34 to rotate the roll 23. In a similar manner, the pinion gear 33 operates through the pinion shaft 30 and the articulated unit 35 to rotate the lower roll 24 of the rolling mill 20. As the centerlines of the rolls 23 and 24 are changed by means of the screwdown 25, the adjusting screw 26 (with the wedges 27 and 28), and because of transverse movement of the entire rolling mill 20 relative to the foundation, the distance between the pinion shafts and the roll necks as well as the angularity of the spindle to their axes is adjusted and changed. The articulated units 34 and 35 serve to provide for transmission of power to the rolls despite these changes. Angularities are compensated for by the fact that the crowned nature of the teeth 43 and their geometric relationship with the internal gear teeth 45, permits considerable angular misalignment without loss of power-transmitting ability. At the same time, the difference in distance between each pinion shaft and its respective roll neck is compensated for by the fact that the length of each articulated unit 34 and 35 can be changed without detriment to its power-transmitting ability.

The articulated units 34 and 35 follow all movements between the rolls and the pinion housing 31 and, with couplings constructed according to the present invention, it is possible for this action to take place without the necessity of the operator taking safety measures against axial shifting of the coupling boxes 44 on the pinion shafts 29 and 30, respectively, or on the roll necks of the rolls 23 and 24. The centering device 46 which exists in each of the couplings makes it possible for the articulated units 34 and 35 to occupy any degree of angular misalignment without the production of detrimental vibrations due to play between the teeth 43 and 45. The centering device operates at the same time in a minimum of space.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A coupling for the spindle of a rolling mill or the like, comprising
   (a) a coupling box having a bore formed with an internal gear,
   (b) an external gear adapted to engage the said internal gear and to be mounted on the spindle,
   (c) a centering pin mounted in the coupling box and extending into a bore in the spindle,
   (d) a spring located in the bore in the spindle and engaging a free end of the centering pin, and
   (e) a self-aligning bearing mounted on the external gear and slidable over the pin, the pin and bearing serving to restrict lateral movement between the coupling box and the spindle.

2. A coupling as recited in claim 1, wherein the centering pin is provided with a broad base which extends across the bore in the coupling box to define a lubricant chamber.

3. A coupling as recited in claim 1, wherein a flexible seal extends between the coupling box and the external gear to define a lubricant chamber.

4. A coupling for the spindle of a rolling mill or the like, comprising
   (a) a coupling member having a bore formed with female coupling surfaces,
   (b) a spindle member having male coupling surfaces adapted to engage the said female coupling surfaces and to be mounted on the spindle,
   (c) a centering pin mounted in the one of the members and extending into a bore in the other member,
   (d) a spring located in the bore in the other member and engaging a free end of the coupling pin, and
   (e) a self-aligning bearing mounted in the bore in the other member and slidable over the pin, the pin and bearing serving to restrict lateral movement between the coupling member and the spindle member.

References Cited in the file of this patent

UNITED STATES PATENTS

| 1,717,481 | Warner | June 18, 1929 |
| 2,679,734 | Morey | June 1, 1954 |
| 2,845,781 | O'Brien | Aug. 5, 1958 |
| 2,982,117 | Erpenstein | May 2, 1961 |

FOREIGN PATENTS

| 354,667 | Germany | June 12, 1922 |

OTHER REFERENCES

British printed application (Luftfahrzeugbau, etc.) 148,251, printed 1922.